(12) United States Patent
Yoon (10) Patent No.: US 8,746,003 B2
(45) Date of Patent: Jun. 10, 2014

(54) WATER FILTER ASSEMBLY AND REFRIGERATOR AND WATER PURIFIER HAVING THE SAME

(75) Inventor: Chul Min Yoon, Seoul (KR)

(73) Assignee: WINIMAX Co., Ltd., Sungnam-Si, Gyeonggi-Do (KR)

( * ) Notice: Subject to any disclaimer, the term of this patent is extended or adjusted under 35 U.S.C. 154(b) by 266 days.

(21) Appl. No.: 13/217,144

(22) Filed: Aug. 24, 2011

(65) Prior Publication Data

US 2012/0324938 A1 Dec. 27, 2012

(30) Foreign Application Priority Data

Jun. 24, 2011 (KR) .......................... 10-2011-0061769

(51) Int. Cl.
*B01D 35/02* (2006.01)
*B01D 35/153* (2006.01)

(52) U.S. Cl.
USPC ............. 62/331; 210/136; 210/175; 210/234; 210/390; 210/236; 210/235; 210/420; 210/109; 210/97; 62/340; 62/344; 62/389; 62/318; 62/190

(58) Field of Classification Search
USPC ............ 62/331, 318; 210/175, 440, 443, 418, 210/109, 117, 136; 222/146.6, 189.06, 222/189.08
See application file for complete search history.

(56) References Cited

U.S. PATENT DOCUMENTS 7,112,997 B1* 9/2006 Liang et al. ...................... 326/81
7,129,745 B2* 10/2006 Lewis et al. ..................... 326/38
7,348,827 B2* 3/2008 Rahim et al. ................... 327/534
7,368,976 B2* 5/2008 Gupta et al. .................... 327/534
7,986,160 B2* 7/2011 Hoang et al. ..................... 326/30
2004/0211717 A1* 10/2004 Mitchell et al. ................ 210/235
2005/0035042 A1* 2/2005 Rowe et al. .................... 210/234

(Continued)

FOREIGN PATENT DOCUMENTS

KR 10-0804302 B1 2/2008
KR 10-0873294 B1 12/2008

(Continued)

OTHER PUBLICATIONS

Office action issued in corresponding Korean Patent Application No. 10-2011-0061769, Office action mailed Jan. 21, 2013 (5 pgs.).
European Search Report for European Application No. 11179938.3, European Search Report dated Nov. 8, 2011 and mailed Nov. 22, 2011 (6 pgs.).
Notice of Allowance mailed Jul. 8, 2013 for corresponding Korean Patent Application No. 10-2011-0061769 (5 pgs.).

*Primary Examiner* — Frantz Jules
*Assistant Examiner* — Meraj A Shaikh
(74) *Attorney, Agent, or Firm* — Christie, Parker & Hale, LLP (57) ABSTRACT

A water filter assembly, and a refrigerator and a water purifier having the same, including: a manifold having a inflow path through which raw water flows in and an outflow path through which filtered water flows out; a case supporting the manifold; and a filter cartridge coupled to a lower side of the case such that it is separable and connected with the outflow port of the manifold, wherein a fluid flow control unit is installed between the manifold and the filter cartridge and rotates according to a rotation of the filter cartridge, the center of the rotation is the same as the center of an outlet of the filter cartridge, and the fluid flow control unit includes a disk having a connection hole allowing the raw water inflow path and an inlet of the filter cartridge to communicate only at a certain position.

15 Claims, 10 Drawing Sheets

(56) References Cited

U.S. PATENT DOCUMENTS

| | | | |
|---|---|---|---|
| 2005/0067342 A1* | 3/2005 | Bassett et al. | 210/418 |
| 2006/0080991 A1* | 4/2006 | An et al. | 62/389 |
| 2006/0091047 A1* | 5/2006 | Ye | 210/109 |
| 2006/0113240 A1* | 6/2006 | Burrows et al. | 210/420 |
| 2007/0040577 A1* | 2/2007 | Lewis et al. | 326/41 |
| 2007/0080102 A1* | 4/2007 | Cur et al. | 210/235 |
| 2007/0284296 A1* | 12/2007 | Swain et al. | 210/235 |
| 2008/0011008 A1* | 1/2008 | Cur et al. | 62/338 |
| 2010/0163477 A1* | 7/2010 | Noh et al. | 210/236 |
| 2011/0063937 A1* | 3/2011 | Eid et al. | 365/226 |

FOREIGN PATENT DOCUMENTS

| | | |
|---|---|---|
| KR | 10-2010-0081827 A | 7/2010 |
| KR | 10-2011-0053380 A | 5/2011 |
| WO | WO 2008/153253 A1 | 12/2008 |

* cited by examiner

WATER FILTER ASSEMBLY AND REFRIGERATOR AND WATER PURIFIER HAVING THE SAME

CROSS-REFERENCE TO RELATED APPLICATION

This application claims priority to and the benefit of Korean Patent Application No. 10-2011-0061769 filed in the Korean Intellectual Property Office on Jun. 24, 2011, the entire contents of which are incorporated herein by reference.

BACKGROUND OF THE INVENTION (a) Field of the Invention

The present invention relates to a water filter assembly and a refrigerator and a water purifier having the same, and more particularly, to a water filter assembly in which changing a filter cartridge and preventing water from being leaked when a filter cartridge is changed are easy and simple, and a refrigerator and a water purifier having the same.

(b) Description of the Related Art

In general, as water pollution becomes more severe due to industrial development and people are increasingly interested in their health, water purified by a water purifier is increasingly being used and a lot of marketed spring water is used.

A water purifier removes foreign objects and the like included in raw water by sedimentation, filtering, sterilizing, or the like, and homes, offices, business establishments, and the like generally use water purifiers.

Various types of water purifiers are manufactured and used according to water purification schemes. A general water purifier includes a plurality of filters for removing foreign objects included in raw water supplied through a water supply pipe to thus purify water.

The filters generally include a sediment filter, a pre-processing carbon filter, a membrane filter, a post-processing carbon filter, and the like, and these filters, having a structure in which they are connected in series through a connection pipe conduit, are fixedly installed in the interior of a main body of a water purifier, and raw water, while sequentially passing through the filters, undergoes sedimentation, filtration, and sterilization through which foreign objects or the like contained in raw water are filtered out.

Each of the filters are installed in the interior of a housing and includes an inlet and an outlet formed at upper and lower portions to and from which raw water is introduced and discharged. The inlets and outlets of the filters are connected by a connection pipe conduit so as to be used.

When a water purifier device is used for a certain period of time, water purification capabilities of the filters are degraded, so the filters are required to be periodically replaced with new filters according to a lifespan of the filters.

In order to change a filter in the water purifier device, the inflow of raw water supplied to the water purifier device is cut off, the connection pipe conduit connected to the inlet and outlet of the filter is separated, and the filter fixed to the water purifier device is then separated. After a new filter is mounted, the connection pipe conduit is connected to an inlet and an outlet of the new filter, thus changing the filter.

The lifespan of each of the filters is different. Thus, in most cases, only a corresponding filter is changed, rather than collectively changing all the filters at one time.

However, as for the related art water filters, when a filter is changed, the connection pipe conduit connected to the inlet and the outlet in a press-fit manner is drawn out, and after the filter is changed, the connection pipe conduit is inserted to be press-fit to the new filter, having a disadvantage in that the filter replacing operation is cumbersome and a great amount of time is required.

Meanwhile, in a recently manufactured refrigerator, in order to supply water which is drinkable or to make ice, water is received from a water supply source, filtered, and supplied to a user through a dispenser.

Like the filters installed in the water purifier device, the filter installed in the refrigerator is degraded in its purification capabilities when it is used for a certain period of time. Thus, the filter installed in the refrigerator is periodically required to be changed for a new filter according to its lifespan.

Also, like the filters installed in the water purifier device, when the filter installed in the refrigerator is separated from an assembly so as to be changed, the water supply source must be cut off, having disadvantages in that the changing of the filter is cumbersome and it is not easy to change the filter.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a water filter assembly having advantages such that changing a filter cartridge and preventing water from being leaked when a filter cartridge is changed are easy and simple, and a refrigerator and a water purifier having the same.

An exemplary embodiment of the present invention provides a water filter assembly including: a manifold having a inflow path through which raw water flows in and an outflow path through which filtered water flows out; a case supporting the manifold; and a filter cartridge coupled to a lower side of the case such that it is separable and connectable with the outflow port of the manifold, wherein a fluid flow control unit is installed between the manifold and the filter cartridge and rotates according to a rotation of the filter cartridge, the center of the rotation is the same as the center of an outlet of the filter cartridge, and the fluid flow control unit includes a disk having a connection hole allowing the raw water inflow path and an inlet of the filter cartridge to communicate only at a certain position.

Another embodiment of the present invention provides a refrigerator including: a supply pipe conduit supplying water to the interior of the refrigerator from a water supply source; a water filter assembly filtering water supplied through the supply pipe conduit; and a dispenser and an ice maker receiving filtered water through the water filter assembly, wherein the water filter assembly includes: a manifold having an inflow path through which raw water flows in and an outflow path through which filtered water flows out; a case supporting the manifold; and a filter cartridge coupled to a lower side of the case such that it is separable and connectable with the outflow port of the manifold, wherein a fluid flow control unit is installed between the manifold and the filter cartridge and rotates according to a rotation of the filter cartridge, the center of the rotation is the same as the center of an outlet of the filter cartridge, and the fluid flow control unit includes a disk having a connection hole allowing the raw water inflow path and an inlet of the filter cartridge to communicate only at a certain position.

Yet another embodiment of the present invention provides a water purifier including: a supply pipe conduit supplying water to the interior of a water purifier from a water supply source; a water filter assembly filtering water supplied through the supply pipe conduit; and a dispenser receiving filtered water through the water filter assembly, cooling or heating, or cooling and heating, the received water, and discharging the same to the outside, wherein the water filter assembly includes: a manifold having an inflow path through which raw water flows in and an outflow path through which filtered water flows out; a case supporting the manifold; and a filter cartridge coupled to a lower side of the case such that it is separable and connectable with the outflow port of the manifold, wherein a fluid flow control unit is installed between the manifold and the filter cartridge and rotates according to a rotation of the filter cartridge, the center of the rotation is the same as the center of an outlet of the filter cartridge, and the fluid flow control unit includes a disk having a connection hole allowing the raw water inflow path and an inlet of the filter cartridge to communicate only at a certain position.

According to embodiments of the present invention, in the water filter assembly, when the filter cartridge is completely mounted in the manifold, the fluid flow control unit is changed into an opening array to allow water to flow, and when the filter cartridge is separated from the manifold, the fluid flow control unit is changed into a closed array to prevent water flow. Thus, when the filter cartridge is changed, water can be prevented from flowing to the outside.

Also, when the filter cartridge is changed, even when the filter is separated from the manifold, water does not flow backward.

DETAILED DESCRIPTION OF THE EMBODIMENTS

An exemplary embodiment of the present invention will hereinafter be described in detail with reference to the accompanying drawings.

Figure 1:
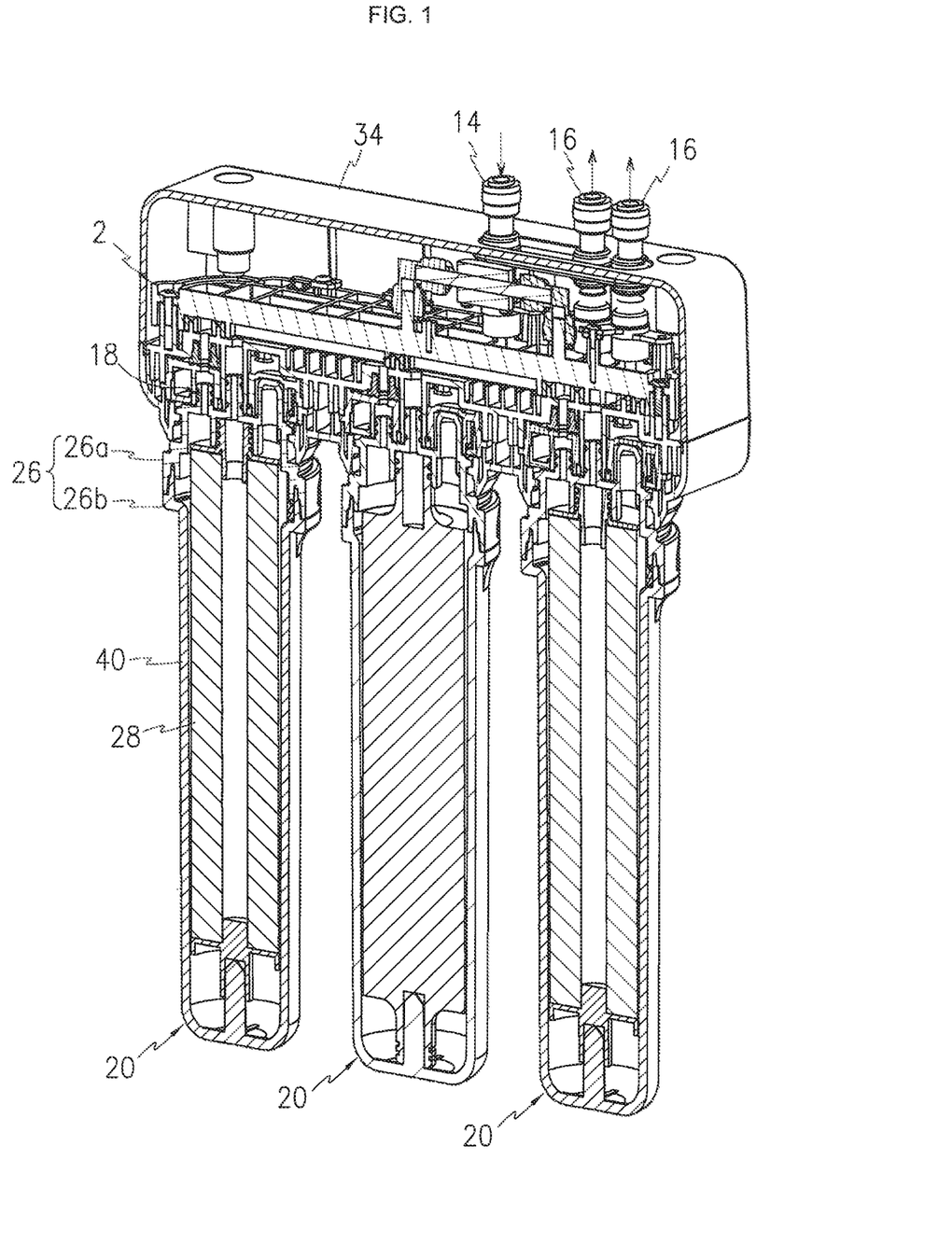
FIG. 1 is a sectional perspective view of a water filter assembly according to an embodiment of the present invention.
Figure 2:
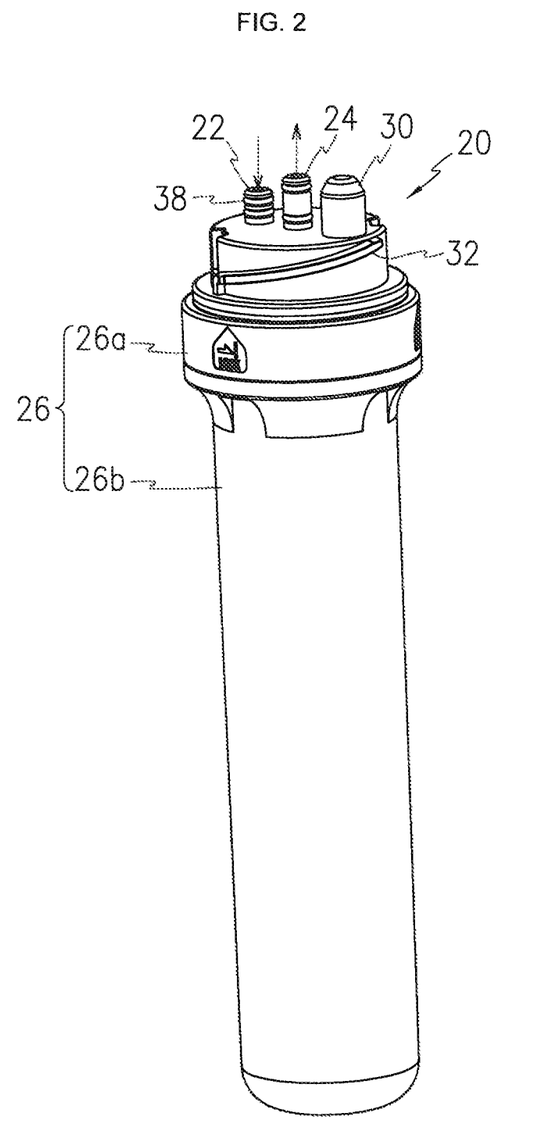
FIG. 2 is a perspective view of a filter cartridge constituting the water filter assembly according to an embodiment of the present invention.
Figure 3:
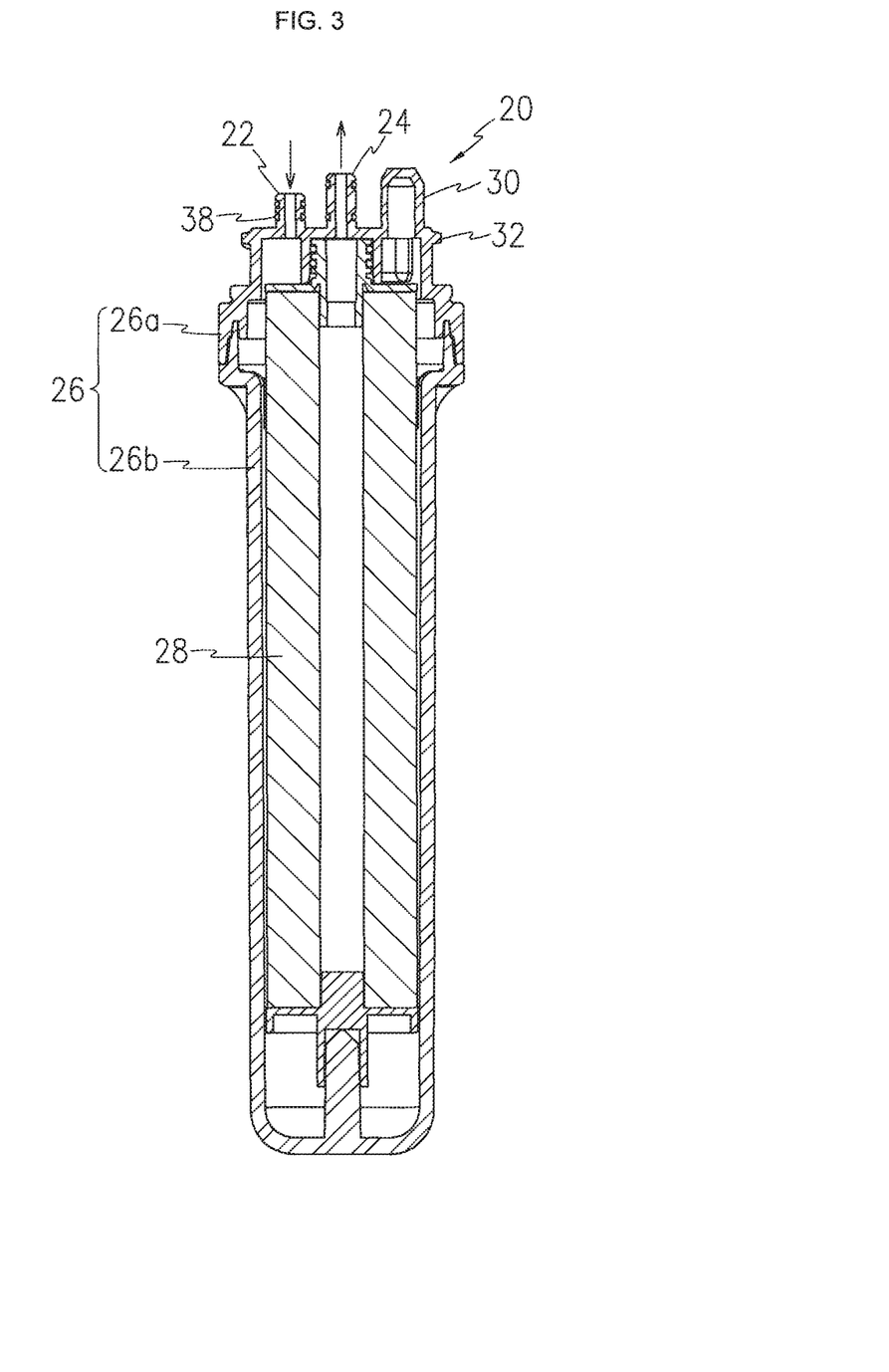
FIG. 3 is a sectional view of the filter cartridge constituting the water filter assembly according to an embodiment of the present invention.
Figure 4:
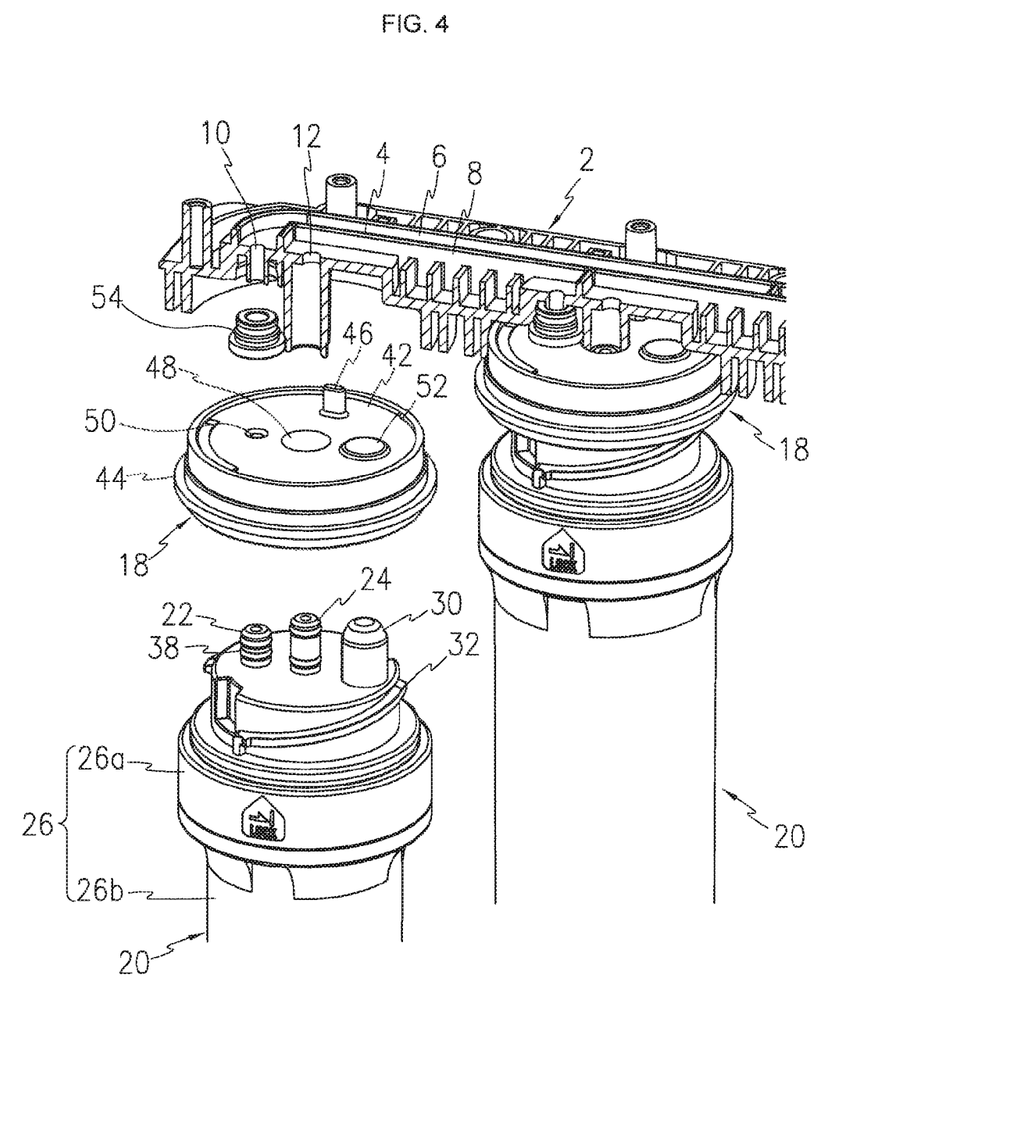
FIG. 4 is a view for explaining how the filter cartridge is assembled in the water filter assembly according to an embodiment of the present invention.

FIG. 1 is a sectional perspective view of a water filter assembly according to an embodiment of the present invention. FIGS. 2 and 3 are a perspective view and a sectional view of a filter cartridge constituting the water filter assembly according to an embodiment of the present invention. FIGS. 4 to 8 are views for explaining how the filter cartridge is mounted in a manifold in the water filter assembly according to an embodiment of the present invention, in which reference numeral 2 denotes a manifold.

The manifold 2 includes an inflow path 6 and an outflow path 8 demarcated by a separation wall 4, and an inflow port 10 and an outflow port 12 are formed on the inflow path 6 and the outflow path 8, respectively, such that they communicate with a filter cartridge (to be described).

The inflow path 6 is connected with a supply pipe 14 supplying water from a water supply source, and the outflow path 8 is connected with a discharge pipe 16 discharging clean water which has been filtered through the filter cartridge.

One or a plurality of discharge pipes 16 may be provided. When a plurality of discharge pipes 16 are provided, one of the discharge pipes 16 may be provided to fit a refrigerator and be connected to a dispenser providing drinking water and the other may be connected to an ice maker.

A fluid flow control unit 18 is assembled to the manifold 2, and a filter cartridge 20 is mounted to be separable through the fluid flow control unit 18.

The filter cartridge 20 includes a housing 26 including an inlet 22 and an outlet 24 which correspond to an inflow port 10 and an outflow port 12 formed at the manifold 2, and a filter 28 installed in the interior of the housing 26 and filtering water introduced through the inlet 22.

The inlet 22 and the outlet 24 are spaced apart and protruded from the housing 26. The outlet 24 is formed at a central portion of an upper face of the housing 26, and a protuberance 30 is formed at a portion symmetrical to the inlet 22 based on the outlet 24.

The protuberance 30 serves to operate the fluid flow control unit 18 when the filter cartridge 20 is mounted to or detached from the manifold 2, and to allow the inflow port 10 of the manifold 2 and the inlet 24 of the filter cartridge 20 to communicate or close the inflow port 10 of the manifold 2.

A stopping protrusion 32 is formed at an outer face of an upper portion of the housing 26, so that when the filter cartridge 20 is mounted to the manifold 2, the stopping protrusion 32 is caught by a projection 36 within a case 34 in which the manifold 2 is installed, so as to be fixed.

An O-ring 38 is provided to an outer circumferential surface of the inlet 22 and the outlet 24, to thereby prevent outflow of water when the filter cartridge 20 is coupled to the manifold 2.

Meanwhile, the housing 26 may include an upper housing 26a and a lower housing 26b which are assembled such that they can be separated.

The inner diameter of the housing 26 is greater than the outer diameter of the filter 28, forming a space portion 40 between an outer surface of the filter 28 and the housing 26. Water introduced through the inlet 22 of the filter cartridge 20 passes through the space portion 38 and the interior of the filter 28 so as to be filtered, and then passes through the outflow port 12 of the manifold 2 through the outlet 24.

One or more filter cartridges may be mounted to the manifold 2, and in this case, the filter 28 may be configured, for example, as a sediment filter, a carbon filter, a membrane filter, or the like. Respective filter cartridges 20, each having such a filter, may be sequentially mounted to the manifold 2, and perform a process of sedimentation, filtration, sterilization, or the like, when raw water such as tap water filters through the filters, to thus remove foreign objects or any other harmful materials included in raw water.

When the filter cartridge 20 is used for a certain period of time, its purification capabilities are degraded. Thus, the filter 28 is required to be periodically replaced with a new filter according to its usage life span. In the water filter assembly according to an embodiment of the present invention, when the filter cartridge 20 is mounted to the manifold 2 or detached therefrom, the fluid flow control unit 18 is operated to open or close the flow of water.

The fluid flow control unit 18 includes a disk 42, a fixing support portion 44 formed at an outer circumferential portion of the disk 42 to rotatably fix the disk 42 to the manifold 2, and a stopper 46 limiting the rotation of the disk 42 to a certain angle.

The disk 42 includes a fixing hole 48 formed at a central portion thereof, and the outflow port 12 of the manifold 2 is inserted into the fixing hole 48. The disk 42 is assembled to the manifold 2 such that it is rotatable in a circumference direction by using the outflow port 12 as a rotational shaft.

A connection hole 50 is formed to be spaced apart from the fixing hole 48 of the disk 42. The connection hole 50 serves to connect the inflow port 10 of the manifold 2 and the inlet 22 of the filter cartridge 20 when the filter cartridge 20 is mounted. A lower portion of the connection hole 50 is formed to allow the inlet 22 of the filter cartridge 20 to be tightly inserted thereto.

A prominence 52 is formed at a portion on an upper face of the disk 42 such that it is symmetrical to the connection hole 50 based on the fixing hole 48. The prominence 52 serves to press a sealing member 54 assembled to the inflow port 10 of the manifold 2 to completely close the inflow port 10 as the disk 42 constituting the fluid flow control unit 18 is rotated in a circumference direction when the filter cartridge 20 is detached from the manifold 2.

A recess 56 is formed on a lower face of the disk 42 to allow the protuberance 30 of the filter cartridge 20 to be inserted therein. The protuberance 30 is formed at a lower portion of the prominence 52.

When the filter cartridge 20 is mounted to or detached from the manifold 2, the fluid flow control unit 18 including the disk 42 is rotated or reversely rotated by a certain angle in the circumference direction based on the fixing hole 48 to allow water to flow to the filter cartridge 20 or prevent flow of water.

A sealing member 58 is provided at a lower portion of the disk 42 to maintain sealing force in a state in which the filter cartridge 20 is mounted.

Also, in order to prevent water from flowing backward to be leaked when the mounted filter cartridge 20 is replaced, a backflow preventing valve 60 for closing the outlet 24 of the filter cartridge 20 at the end portion is installed in the manifold 2.

The backflow preventing valve 60 includes a valve main body 62 for opening and closing the outflow port 12 of the filter cartridge 20 and a fixed portion 64 extending from the valve main body 62 and fixed to the manifold 2.

Figure 9:
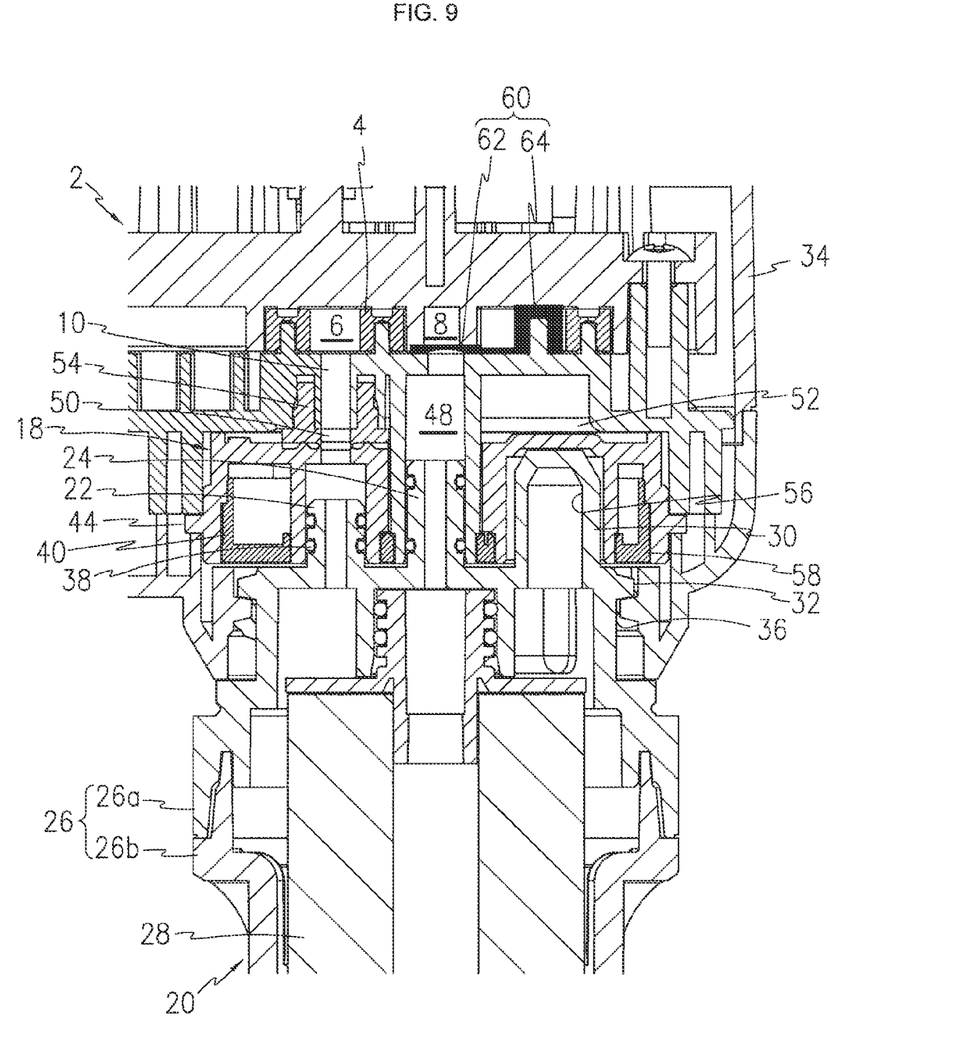
FIG. 9 is a sectional view for explaining a state in which an outlet valve is open in the water filter assembly according to an embodiment of the present invention.
Figure 10:
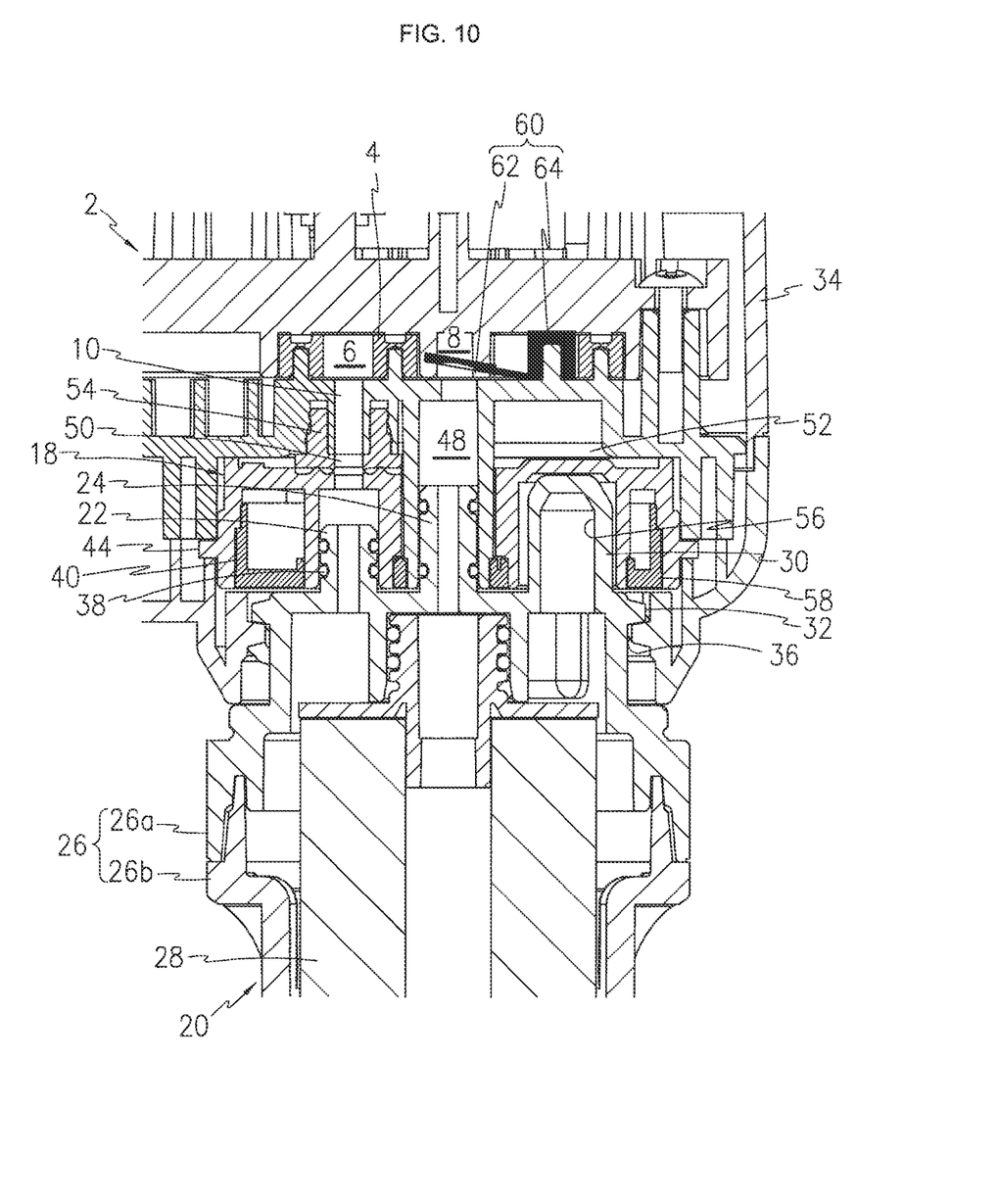
FIG. 10 is a sectional view for explaining a state in which the outlet valve is closed in the water filter assembly according to an embodiment of the present invention.

When water flows from the filter cartridge 20 to the manifold 2, the valve main body 62 opens the final outflow port 12 of the manifold 2 by water pressure as shown in FIG. 9, and when the flow of water is stopped, the valve main body 62 closes the final outflow port 12 by self-load as shown in FIG. 10.

Thus, although the filter cartridge 20 is detached from the manifold 2 in order to replace the corresponding filter cartridge 20, water in the discharge pipe 16 and the pipe conduit connected thereto is maintained in its state, rather than flowing back.

The water filter assembly according to an embodiment of the present invention as described above may be provided to be used in a refrigerator or a water purifier such that clean drinking water and ice can be obtained, and a supply pipe conduit supplying water from a water supply source may be connected to the supply pipe 14 of the water filter assembly mounted in the refrigerator or the water purifier and a certain pipe conduit may be connected to the discharge pipe 16 discharging purified water so as to be connected to a dispenser or an ice maker to allow the user to use filtered water.

The water filter assembly may be mounted on the ceiling in the interior of a refrigerator or on an inner side wall of the refrigerator so as to be used, or may be mounted in the interior of a water purifier so as to be used.

Here, in a state in which the filter cartridge 20 is not mounted to the manifold 2, the inflow port 10 of the manifold 2 is maintained in a closed state as the prominence 52 formed at an upper portion of the disk 42 of the fluid flow control unit 18 presses the sealing member 54.

Figure 5:
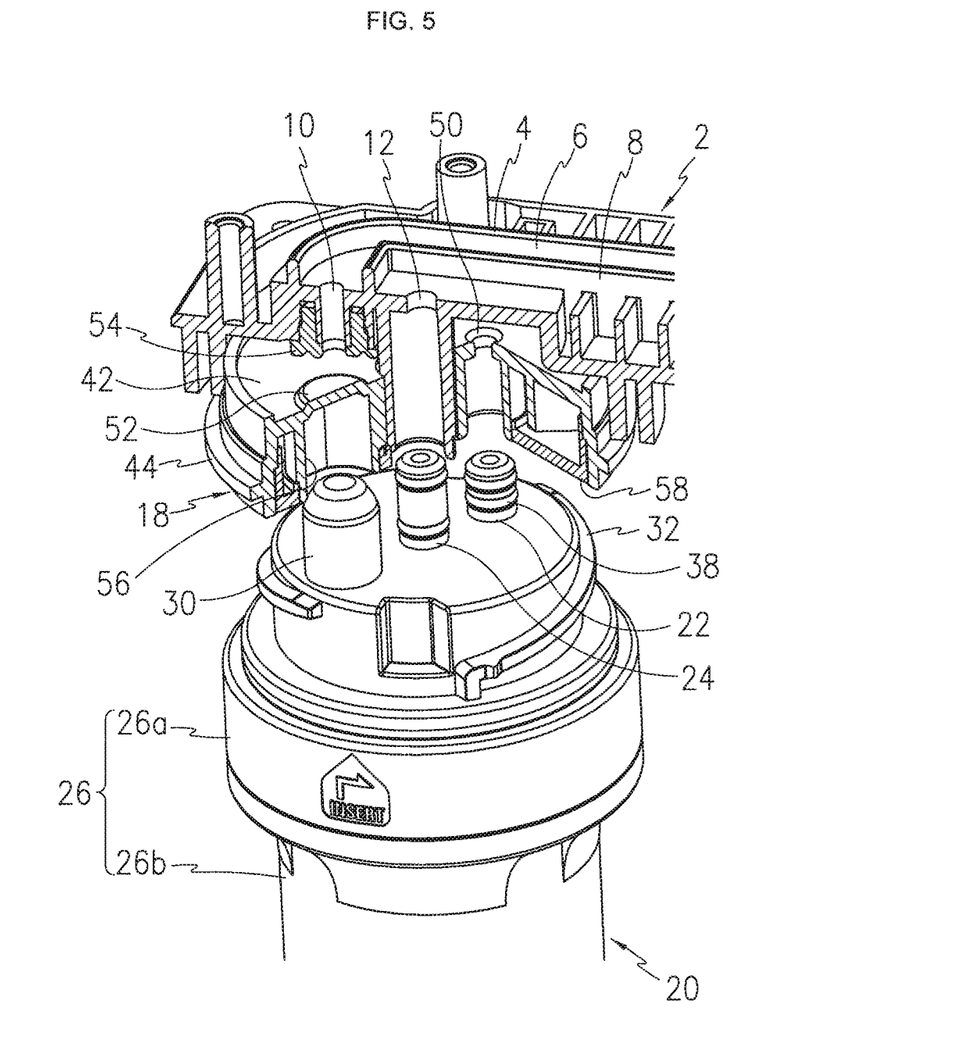
FIGS. 5 and 6 are a partially cut perspective view and a sectional view for explaining a state before the filter cartridge constituting the water filter assembly is mounted in a manifold according to an embodiment of the present invention.
Figure 6:
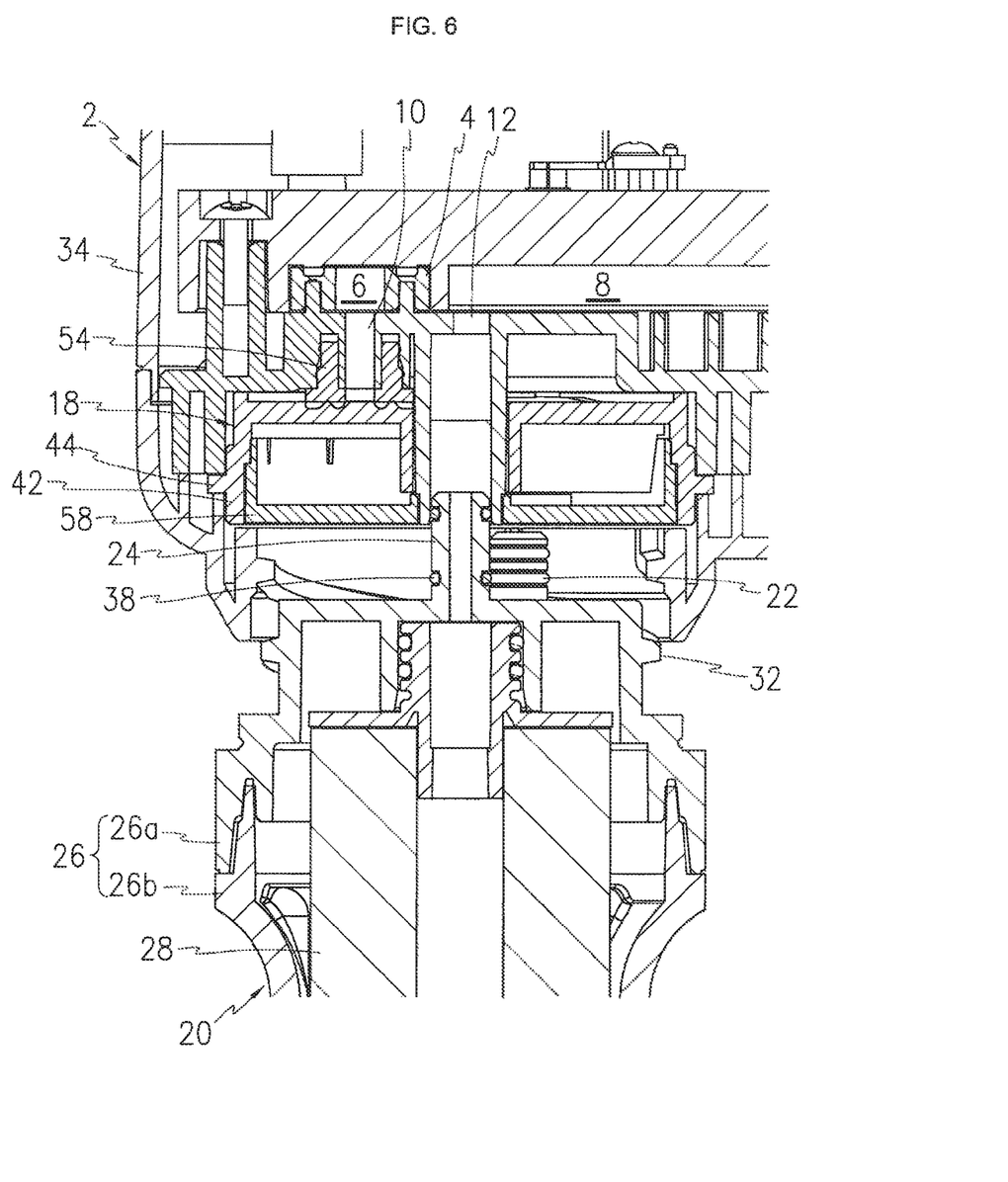

In this state, when the filter cartridge 20 is to be mounted, as shown in FIGS. 5 and 6, the protuberance 30 is inserted into the recess 56 of the manifold 2, and the outlet 24 and the inlet 22 are inserted into the outflow port 12 and the connection hole 50 of the disk 42.

When the filter cartridge 20 is rotated while being pushed up toward the fluid flow control unit 18, the disk 42 is rotated in the circumference direction based on the outflow port 12, and in this state, when the filter cartridge 20 is continuously rotated by a certain angle (about 120 degrees), the stopper 46 is caught by a projection (not shown) formed on the manifold 2, whereby the filter cartridge 20 is completely mounted and is not rotated any further.

When the filter cartridge 20 is mounted, the spiral stopping protrusion 32 formed on the housing 26 moves along the projection 36 formed in the case 34 and then is caught to firmly maintain the mounted state.

Figure 7:
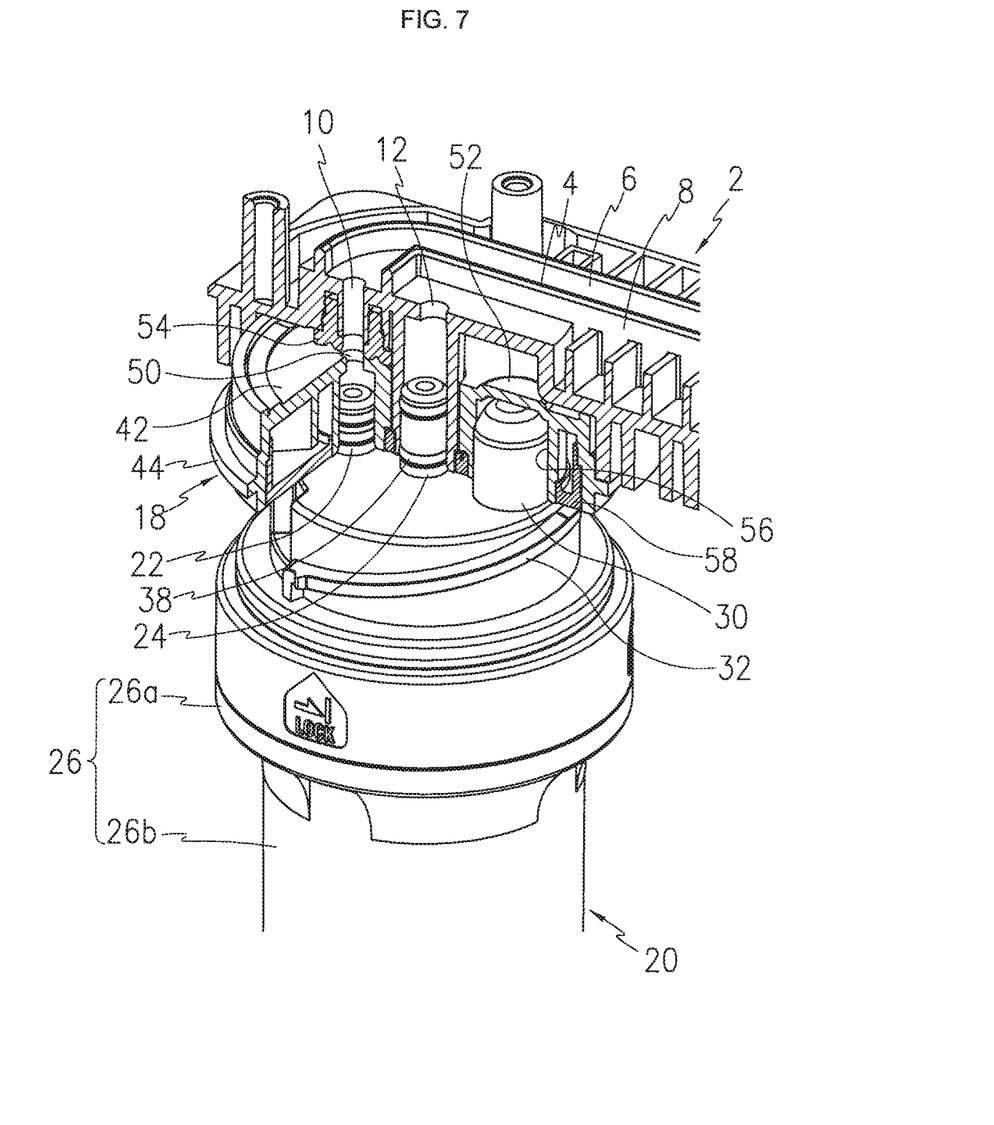
FIGS. 7 and 8 are a partially cut perspective view and a sectional view for explaining a state in which the filter cartridge constituting the water filter assembly is mounted in the manifold according to an embodiment of the present invention.
Figure 8:
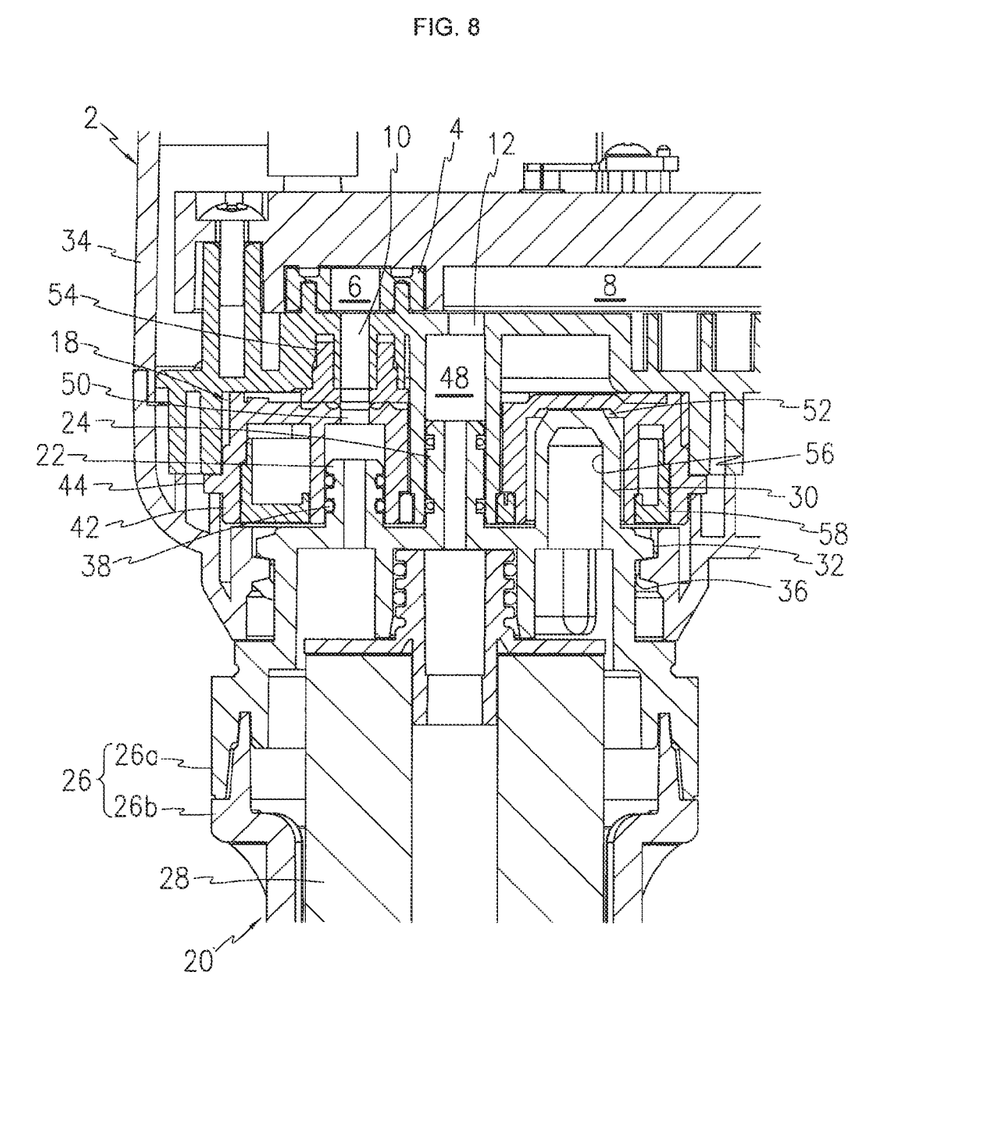

In this manner, when the mounting of the filter cartridge 20 is completed, as shown in FIGS. 7 and 8, the outlet 24 of the filter cartridge 20 is consistent with the outflow port 12 of the manifold 2, and the inlet 22 of the filter cartridge 20 is consistent with the inflow port 10 formed in the manifold 2, allowing water to flow toward the filter cartridge 20.

When the filter cartridges 20 are all mounted to the manifold 2, the inlet 22 and the outlet 24 of the filter cartridge are maintained to be connected with the inflow path 6 and the outflow path 8 of the manifold 2, allowing water introduced through the supply pipe 14 to sequentially pass through the filter cartridges 20, during which foreign objects are filtered out, and as the backflow preventing valve 60 is open by water pressure, water is discharged through the discharge pipe 16.

A pipe conduit (not shown) is connected to the discharge pipe 16 to supply clean water to a dispenser, an ice maker, or the like, of a refrigerator, or to a dispenser of a water purifier.

When the filter cartridges 20 are to be changed with new ones after having been used for a certain period of time, the filter cartridges 20 are removed in reverse order to that when the filter cartridges 20 were mounted, and new filter cartridges are mounted. Here, when the filter cartridges 20 are rotated in a direction opposite to that when the filter cartridges 20 were mounted at the manifold 2, the disk 42 constituting the fluid flow control unit 18 is rotated in the opposite direction to that when the filter cartridges 20 were mounted and the inflow port 10 of the manifold 2 is maintained in a closed state as the prominence 52 formed at the upper portion of the disk 42 of the fluid flow control unit 18 presses the sealing member 54.

Accordingly, although the filter cartridges 20 are separated, water cannot flow out to the outside of the water filter assembly, and at this time, the backflow preventing valve 60 closes the outlet 24 of the final filter cartridge 20, preventing water from flowing backward.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of Symbols> | |
| --- | --- |
| 2: manifold | 4: separation wall |
| 6: inflow path | 8: outflow path |
| 10: inflow port | 12: outflow port |
| 14: supply pipe | 16: discharge pipe |
| 18: fluid flow control unit | 20: filter cartridge |
| 22: inlet | 24: outlet |
| 26: housing filter | 28: filter |
| 30: protuberance | 32: stopping protrusion |
| 34: case | 36: projection |
| 38: O-ring | 40: space portion |
| 42: disk | 44: fixing support portion |
| 46: stopper | 48: fixing hole |
| 50: connection hole | 52: prominence |
| 54, 58: sealing member | 56: recess |
| 60: backflow preventing valve | 62: valve main body |
| 64: fixed portion | |

What is claimed is:

1. A water filter assembly comprising:
   a manifold having an inflow path through which raw water flows in, an outflow path through which filtered water flows out, an inflow port formed on the inflow path, and an outflow port formed on the outflow path;
   a case supporting the manifold;
   a filter cartridge configured to be coupled to a lower side of the case such that the filter is separable and connectable with the outflow port of the manifold; and
   a fluid flow control unit installed between the manifold and the filter cartridge, the fluid flow control unit being configured to rotate according to a rotation of the filter cartridge such that the center of rotation of the fluid flow control unit is the same as the center of an outlet of the filter cartridge, the fluid flow control unit including a disk rotatably installed on the manifold and having a connection hole which connects the inflow port and an inlet of the filter cartridge only at a certain rotational position,
   wherein an upper face of the disk includes a prominence formed to press against a lower surface of a sealing member assembled to the inflow port of the manifold to completely close the inflow port upon rotation of the disk about the center of rotation when the filter cartridge is detached from the manifold, and
   wherein the sealing member has a tubular, cylindrical shape the inflow port, the lower surface of the sealing member extends below an opening of the inflow port, such that the prominence presses against the lower surface of the sealing member but not against the inflow port, and the lower surface of the sealing member has a notch.

2. The water filter assembly of claim 1, wherein a supply pipe supplying raw water to the inflow path and a discharge pipe discharging clean water which has been filtered through the filter cartridge are protruded from an outer side of the manifold.

3. The water filter assembly of claim 2, wherein one or a plurality of discharge pipes are provided.

4. The water filter assembly of claim 1, wherein a protuberance for operating the fluid flow control unit is formed at a housing of the filter cartridge.

5. The water filter assembly of claim 4, wherein the protuberance is formed at a portion symmetrical to the inlet based on the outlet formed at the housing of the filter cartridge.

6. The water filter assembly of claim 1, wherein the inlet and the outlet formed on a housing of the filter cartridge are spaced apart and protruded from the housing.

7. The water filter assembly of claim 1, wherein a spiral stopping protrusion is formed on a housing of the filter cartridge in order to firmly mount the filter cartridge to the fluid flow control unit.

8. The water filter assembly of claim 1, wherein a backflow preventing valve is installed at the outflow port formed at the manifold in order to prevent water from flowing backward when the filter cartridge is changed.

9. The water filter assembly of claim 8, wherein the backflow preventing valve opens the outflow port of an end portion by water pressure when water flows from the filter cartridge to the manifold, and closes the outflow port by self-load when water does not flow.

10. A refrigerator comprising:
    a supply pipe conduit supplying water to the interior of the refrigerator from a water supply source;
    a water filter assembly filtering water supplied through the supply pipe conduit; and
    a dispenser receiving filtered water through the water filter assembly,
    wherein the water filter assembly comprises:
    a manifold having an inflow path through which raw water flows in, an outflow path through which filtered water flows out, an inflow port formed on the inflow path, and an outflow port formed on the outflow path;
    a case supporting the manifold;
    a filter cartridge configured to be coupled to a lower side of the case such that the filter is separable and connectable with the outflow port of the manifold; and
    a fluid flow control unit installed between the manifold and the filter cartridge, the fluid flow control unit being configured to rotate according to a rotation of the filter cartridge such that the center of rotation of the fluid flow control unit is the same as the center of an outlet of the filter cartridge, the fluid flow control unit including a disk rotatably installed on the manifold and having a connection hole which connects the inflow port and an inlet of the filter cartridge only at a certain rotational position,
    wherein an upper face of the disk includes a prominence formed to press against a lower surface of a sealing member assembled to the inflow port of the manifold to completely close the inflow port upon rotation of the disk about the center of rotation when the filter cartridge is detached from the manifold, and
    wherein the sealing member has a tubular, cylindrical shape surrounding the inflow port, the lower surface of the sealing member extends below an opening of the inflow port, such that the prominence presses against the lower surface of the sealing member but not against the inflow port, and the lower surface of the sealing member has a notch.

11. The refrigerator of claim 10, wherein a backflow preventing valve is installed at the outflow port formed at the manifold in order to prevent water from flowing backward when the filter cartridge is changed.

12. A refrigerator comprising:

a supply pipe conduit supplying water to the interior of the refrigerator from a water supply source;

a water filter assembly filtering water supplied through the supply pipe conduit; and a dispenser and an ice maker receiving filtered water through the water filter assembly, wherein the water filter assembly comprises:

a manifold having an inflow path through which raw water flows in, an outflow path through which filtered water flows out, an inflow port formed on the inflow path, and an outflow port formed on the outflow path;

a case supporting the manifold;

a filter cartridge configured to be coupled to a lower side of the case such that the filter is separable and connectable with the outflow port of the manifold; and a fluid flow control unit installed between the manifold and the filter cartridge, the fluid flow control unit being configured to rotate according to a rotation of the filter cartridge such that the center of rotation of the fluid flow control unit is the same as the center of an outlet of the filter cartridge, the fluid flow control unit including a disk rotatably installed on the manifold and having a connection hole which connects the inflow port and an inlet of the filter cartridge only at a certain rotational position, wherein an upper face of the disk includes a prominence formed to press against a lower surface of a sealing member assembled to the inflow port of the manifold to completely close the inflow port upon rotation of the disk about the center of rotation when the filter cartridge is detached from the manifold, and wherein the sealing member has a tubular, cylindrical shape surrounding the inflow port, the lower surface of the sealing member extends below an opening of the inflow port, such that the prominence presses against the lower surface of the sealing member but not against the inflow port, and the lower surface of the sealing member has a notch.

13. The refrigerator of claim 12, wherein a backflow preventing valve is installed at the outflow port formed at the manifold in order to prevent water from flowing backward when the filter cartridge is changed.

14. A water purifier in a refrigerator comprising:

a supply pipe conduit supplying water to the interior of a water purifier from a water supply source;

a water filter assembly filtering water supplied through the supply pipe conduit; and a dispenser receiving filtered water through the water filter assembly, cooling or heating, or cooling and heating, the received water, and discharging the same to the outside, wherein the water filter assembly comprises:

a manifold having an inflow path through which raw water flows in, an outflow path through which filtered water flows out, an inflow port formed on the inflow path, and an outflow port formed on the outflow path;

a case supporting the manifold;

a filter cartridge configured to be coupled to a lower side of the case such that the filter is separable and connectable with the outflow port of the manifold; and a fluid flow control unit installed between the manifold and the filter cartridge, the fluid flow control unit being configured to rotate according to a rotation of the filter cartridge such that the center of rotation of the fluid flow control unit is the same as the center of an outlet of the filter cartridge, the fluid flow control unit including a disk rotatably installed on the manifold and having a connection hole which connects the inflow port and an inlet of the filter cartridge only at a certain rotational position, wherein an upper face of the disk includes a prominence formed to press against a lower surface of a sealing member assembled to the inflow port of the manifold to completely close the inflow port upon rotation of the disk about the center of rotation when the filter cartridge is detached from the manifold, and wherein the sealing member has a tubular, cylindrical shape surrounding the inflow port, the lower surface of the sealing member extends below an opening of the inflow port, such that the prominence presses against the lower surface of the sealing member but not against the inflow port, and the lower surface of the sealing member has a notch.

15. The water purifier of claim 14, wherein a backflow preventing valve is installed at the outflow port formed at the manifold in order to prevent water from flowing backward when the filter cartridge is changed.

* * * * *